(12) United States Patent
Brunet et al.

(10) Patent No.: US 7,702,830 B2
(45) Date of Patent: *Apr. 20, 2010

(54) METHODS FOR SELECTIVELY COPYING DATA FILES TO NETWORKED STORAGE AND DEVICES FOR INITIATING THE SAME

(75) Inventors: Jeffrey Brunet, Richmond Hill (CA); Yousuf Chowdhary, Richmond Hill (CA); Ian Collins, Richmond Hill (CA); Eric Li, Richmond Hill (CA)

(73) Assignee: Storage Appliance Corporation, Richmond Hill, Ontario (CA)

( * ) Notice: Subject to any disclaimer, the term of this patent is extended or adjusted under 35 U.S.C. 154(b) by 34 days.

This patent is subject to a terminal disclaimer.

(21) Appl. No.: 11/601,040

(22) Filed: Nov. 16, 2006

(65) Prior Publication Data

US 2007/0083356 A1   Apr. 12, 2007

Related U.S. Application Data

(60) Continuation of application No. 11/506,386, filed on Aug. 18, 2006, which is a division of application No. 11/492,380, filed on Jul. 24, 2006, application No. 11/601,040, which is a continuation-in-part of application No. 11/546,176, filed on Oct. 10, 2006.

(60) Provisional application No. 60/725,225, filed on Oct. 12, 2005, provisional application No. 60/834,247, filed on Jul. 31, 2006, provisional application No. 60/836,228, filed on Aug. 9, 2006, provisional application No. 60/814,687, filed on Jun. 19, 2006, provisional application No. 60/817,540, filed on Jun. 30, 2006.

(51) Int. Cl.
| | |
|---|---|
| G06F 13/12 | (2006.01) |
| G06F 3/00 | (2006.01) |
| G06F 12/00 | (2006.01) |
| G06F 11/00 | (2006.01) |

(52) U.S. Cl. .............. 710/62; 710/8; 710/60; 711/114; 711/161; 711/162; 714/6

(58) Field of Classification Search .......... 710/60, 710/8, 62; 711/114, 161, 162; 714/6
See application file for complete search history.

(56) References Cited

U.S. PATENT DOCUMENTS 5,666,215 A   9/1997   Fredlund et al.

(Continued)

FOREIGN PATENT DOCUMENTS

WO    WO 00/19294    4/2000

(Continued)

OTHER PUBLICATIONS

Rothman, Wilson, "Now It's Easy to Back Up Data on a Network," The New York Times, Mar. 30, 2006, http://www.nytimes.com.

(Continued)

*Primary Examiner*—Niketa I Patel
(74) *Attorney, Agent, or Firm*—Gard & Kaslow LLP

(57) ABSTRACT

A data backup system comprises a USB flash drive that includes an emulation component and a flash memory. The emulation component is configured to represent the flash memory as if it were an auto-launch device. Accordingly, a data source, such as a personal computer, will interact with the flash memory as if it were the auto-launch device. As some operating systems are configured to recognize auto-launch devices upon connection and automatically execute applications stored thereon, merely connecting the USB flash drive to a data source running such an operating system will cause a backup application stored by the flash memory to automatically execute on the data source. Here, the backup application is configured to selectively back up data files from the data source to a networked storage such as a server of a commercial service provider.

20 Claims, 7 Drawing Sheets

U.S. PATENT DOCUMENTS

| | | | |
|---|---|---|---|
| 5,835,759 | A | 11/1998 | Moore et al. |
| 5,960,411 | A | 9/1999 | Hartman et al. |
| 6,119,153 | A | 9/2000 | Dujari et al. |
| 6,282,710 | B1 | 8/2001 | Boehler |
| 6,401,214 | B1 | 6/2002 | Li |
| 6,405,362 | B1 | 6/2002 | Shih et al. |
| 6,477,575 | B1 | 11/2002 | Koeppel et al. |
| 6,488,581 | B1 | 12/2002 | Stockdale |
| 6,506,236 | B2 | 1/2003 | Pollack |
| 6,529,992 | B1 | 3/2003 | Thomas et al. |
| 6,567,273 | B1 | 5/2003 | Liu et al. |
| 6,588,662 | B1 | 7/2003 | Hu |
| 6,606,644 | B1 | 8/2003 | Ford et al. |
| 6,609,173 | B1 | 8/2003 | Watkins |
| 6,731,536 | B1 | 5/2004 | McClain et al. |
| 6,751,681 | B2 | 6/2004 | Torii et al. |
| 6,832,107 | B2 | 12/2004 | Mashiko |
| 6,856,425 | B2 | 2/2005 | Ozawa et al. |
| 6,876,461 | B2 | 4/2005 | Usami |
| 6,879,988 | B2 | 4/2005 | Basin et al. |
| 6,898,517 | B1 | 5/2005 | Froeberg |
| 6,943,681 | B2 | 9/2005 | Rezvani et al. |
| 6,976,253 | B1 | 12/2005 | Wierman et al. |
| 6,985,248 | B2 | 1/2006 | Parulski et al. |
| 6,986,030 | B2 | 1/2006 | Shmueli et al. |
| 6,993,760 | B2 | 1/2006 | Peev et al. |
| 7,017,155 | B2 | 3/2006 | Peev et al. |
| 7,024,529 | B2 | 4/2006 | Yamada |
| 7,054,260 | B2 | 5/2006 | Rilum et al. |
| 7,054,594 | B2 | 5/2006 | Bloch et al. |
| 7,111,121 | B2 | 9/2006 | Oishi et al. |
| 7,136,288 | B2 | 11/2006 | Hoogerdijk |
| 7,162,500 | B2 | 1/2007 | Iguchi |
| 7,302,538 | B2 | 11/2007 | Liu |
| 2001/0047389 | A1 | 11/2001 | Prahlad et al. |
| 2002/0036850 | A1 | 3/2002 | Lenny et al. |
| 2002/0162009 | A1 | 10/2002 | Shmueli et al. |
| 2002/0184115 | A1 | 12/2002 | Mueller et al. |
| 2002/0184459 | A1 | 12/2002 | Taussig et al. |
| 2002/0188566 | A1 | 12/2002 | Inchalik et al. |
| 2002/0191788 | A1 | 12/2002 | Inchalik et al. |
| 2002/0196729 | A1 | 12/2002 | Fairman et al. |
| 2002/0196940 | A1 | 12/2002 | Isaacson et al. |
| 2003/0048735 | A1 | 3/2003 | Sawada et al. |
| 2003/0050940 | A1 | 3/2003 | Robinson |
| 2003/0058763 | A1 | 3/2003 | Noda |
| 2003/0069750 | A1 | 4/2003 | Siegel et al. |
| 2003/0074529 | A1 | 4/2003 | Crohas |
| 2003/0120740 | A1 | 6/2003 | Beeman et al. |
| 2003/0156341 | A1 | 8/2003 | Ito |
| 2003/0163610 | A1 | 8/2003 | Stevens |
| 2003/0182471 | A1 | 9/2003 | Harris et al. |
| 2003/0190137 | A1 | 10/2003 | Pesce |
| 2003/0195737 | A1 | 10/2003 | Shapiro et al. |
| 2003/0225971 | A1 | 12/2003 | Oishi et al. |
| 2004/0008209 | A1 | 1/2004 | Adams et al. |
| 2004/0078514 | A1 | 4/2004 | Kung et al. |
| 2004/0083473 | A1 | 4/2004 | Thomas et al. |
| 2004/0088456 | A1 | 5/2004 | Zhang |
| 2004/0145988 | A1 | 7/2004 | Watanabe |
| 2004/0167941 | A1 | 8/2004 | Prahlad et al. |
| 2004/0172427 | A1 | 9/2004 | Thomas et al. |
| 2004/0172489 | A1 | 9/2004 | Shikada |
| 2004/0184174 | A1 | 9/2004 | Woo |
| 2004/0193744 | A1 | 9/2004 | Paley |
| 2004/0199600 | A1 | 10/2004 | Dorundo et al. |
| 2004/0230653 | A1 | 11/2004 | Liao |
| 2005/0010835 | A1 | 1/2005 | Childs et al. |
| 2005/0015536 | A1 | 1/2005 | Lee |
| 2005/0015559 | A1 | 1/2005 | Shen et al. |
| 2005/0021880 | A1 | 1/2005 | Robbin et al. |
| 2005/0060356 | A1* | 3/2005 | Saika .................... 707/204 |
| 2005/0080973 | A1 | 4/2005 | Lee |
| 2005/0083741 | A1 | 4/2005 | Chang et al. |
| 2005/0174676 | A1 | 8/2005 | Lin |
| 2005/0193389 | A1 | 9/2005 | Murphy et al. |
| 2005/0216746 | A1 | 9/2005 | Saika |
| 2005/0216794 | A1 | 9/2005 | Yagawa |
| 2005/0228836 | A1* | 10/2005 | Bacastow et al. ........... 707/204 |
| 2005/0245249 | A1 | 11/2005 | Wierman et al. |
| 2005/0246583 | A1* | 11/2005 | Robinson .................... 714/15 |
| 2005/0253554 | A1 | 11/2005 | DiFazio et al. |
| 2005/0268339 | A1 | 12/2005 | Bobrow |
| 2005/0278432 | A1 | 12/2005 | Feinleib et al. |
| 2006/0010078 | A1 | 1/2006 | Rezvani et al. |
| 2006/0031289 | A1 | 2/2006 | Experton |
| 2006/0036553 | A1 | 2/2006 | Gupta et al. |
| 2006/0041639 | A1 | 2/2006 | Lamkin et al. |
| 2006/0075293 | A1 | 4/2006 | Bodlaender |
| 2006/0080521 | A1 | 4/2006 | Barr et al. |
| 2006/0143376 | A1 | 6/2006 | Matze et al. |
| 2006/0164891 | A1* | 7/2006 | Mills et al. ............. 365/185.33 |
| 2006/0179448 | A1 | 8/2006 | Smith et al. |
| 2006/0190722 | A1 | 8/2006 | Sharma et al. |
| 2008/0215873 | A1* | 9/2008 | Bobrow ........................ 713/2 |

FOREIGN PATENT DOCUMENTS

| | | |
|---|---|---|
| WO | WO 01/27768 | 4/2001 |
| WO | WO 01/84265 | 11/2001 |
| WO | WO 02/18009 | 3/2002 |
| WO | WO 02/39231 | 5/2002 |
| WO | WO 03/014933 | 2/2003 |
| WO | WO 03/048944 | 6/2003 |
| WO | WO 2004/067286 | 8/2004 |
| WO | WO 2007/041849 | 4/2007 |
| WO | WO 2007/041850 | 4/2007 |

OTHER PUBLICATIONS

TurnKey Technology Solutions, Apr. 10, 2007, http://www.turnkeytechnology.biz/.

Takahashi, Dean, "Backup Drive Fits in a Pocket," First Look, Tech Insider, San Jose Mercury News, Jun. 4, 2007, pp. 2E.

Wong, Nicole, "One Key Stroke Saves Your Data," First Look, Tech Insider, San Jose Mercury News, Apr. 2, 2007, pp. 2E.

Duryee, Tricia, "Store Your Digital Content on a Hard Drive in the Sky," Tech Monday, San Jose Mercury News, Jul. 3, 2006, pp. 5E.

Brown, Christopher L. T., "Analysis of the ATA Protected Area," Technical White Paper, TechPathways LLC, 2002, www.TechPathways.com.

Parvaneh, Marc K., "CDR-ROM ™ Overview & Implementations," ODC White Paper, Optical Disc Corporation.

"Backup Drives Essential but Underused," Consumer Report, Sep. 2006, pp. 30-31.

"Enhanced Drive Self-Test—Winning the War Against Unneccessary Drive Returns," Executive Summary, Personal Storage Product Marketing, Jun. 2000, No. TP-302.1, Seagate.

Evans, Mark, "Hard Drive Self-Tests," Quantum Corporation, Apr. 26, 1999, T10/99-179 rev 0.

"Attachment Extractor for Outlook Express v. 1.5," Software, 2003-2008 NSoftware.

"Mailbox Fetch," Group Fetch, 2006 GroupFetch.com.

"Outlook, Outlook Express, and Windows Mail Attachment Tools . . . ," Outlook Attachment and Picture Extractor, 2006, OPE2000.com.

"Save Message," InboxRULES, Ornic USA, LLC, 1996-2007, Ornic USA, LLC.

Mirra.com, "Frequently Asked Questions about Mirra" Feb. 2005, Mirra.com and Archive.org <http://web.archive.org/web/20050206184942/www.mirra.com/product/file_backup_guide.html>, pp. 1-5.

Mirra.com, "Why Mirra is Different . . . and Better" Feb. 2005, Mirra.com and Archive.org <http://web.archive.org/web/20050206192005/www.mirra.com/product/why_mirra_is_different.html>, p. 5.

Page 2 from the following web page archived on Jan. 25, 2005: http://web.archive.org/web/20050125085304/http://www.bjorn3d.com/read.php?cID=748.

Page 2 from the following webpage archived on Jan. 25, 2005: http://web.archive.org/web/20050125085304/http://www.bjorn3d.com/read.php?cID=748.

"Creating an AutoRun-enabled CD-ROM Application", Microsoft Developer Network, http://msdn.microsoft.com/en-us/library/cc144202(VS.85).aspx.

* cited by examiner

METHODS FOR SELECTIVELY COPYING DATA FILES TO NETWORKED STORAGE AND DEVICES FOR INITIATING THE SAME

CROSS-REFERENCE TO RELATED APPLICATIONS

This application is a continuation-in-part application of, and claims priority to, U.S. Non-Provisional patent application Ser. No. 11/506,386 filed on Aug. 18, 2006 and entitled "Data Backup Devices and Methods for Backing up Data" which is a divisional application of U.S. Non-Provisional patent application Ser. No. 11/492,380 filed on Jul. 24, 2006 and entitled "Emulation Component for Data Backup Applications" which claims the benefit of U.S. Provisional Patent Application No. 60/725,225 filed on Oct. 12, 2005 and entitled "A Method, Apparatus and a System for Removable Media Device Emulation on an External Storage Device via an Emulation Component for the Purpose of an Electronic Data Backup Appliance," U.S. Provisional Patent Application No. 60/814,687 filed on Jun. 19, 2006 and entitled "Portable Electronic Data Backup Appliance Based on Integrated Circuit (IC) Memory," and U.S. Provisional Patent Application No. 60/817,540 filed on Jun. 30, 2006 and entitled "Portable Data Backup Appliance for Utilizing a Recordable Media Burner Device;" this application is also a continuation-in-part application of, and claims priority to, U.S. Non-Provisional patent application Ser. No. 11/546,176 filed on Oct. 10, 2006 and entitled "Optical Disc Initiated Data Backup" which claims the benefit of U.S. Provisional Patent Application Nos. 60/834,247 and 60/836,228 filed on Jul. 31, 2006 and on Aug. 9, 2006, respectively, and both entitled "A Portable Electronic Data Backup Appliance Utilizing a Hybrid Optical Disc." Each of the aforementioned applications is incorporated herein by reference.

BACKGROUND OF THE INVENTION

1. Field of the Invention

The present invention relates generally to the field of digital data management and more particularly to systems for data backup applications.

2. Description of the Prior Art

Digital content, represented by digital data files of various file types, is rapidly replacing other forms of content. Documents, presentations, photos, movies, and music, for example, are increasingly produced and stored digitally. A problem for many individuals and organizations is that digital content, typically stored on a computer hard drive, can be poorly organized and needs to be archived to be protected against accidental loss. For example, digital photo files on a personal computer (PC) are likely to be found in numerous folders—photos transferred from a digital camera are stored in one set of folders, photos received as e-mail attachments are stored in other folders, and photos downloaded from websites are stored in still other folders.

One approach to archiving digital content is to periodically backup all of the data files on the computer, preserving the existing organizational structure. While this technique is effective to preserve digital content against accidental loss, the technique has several shortcomings. For one, the resulting copy is no better organized than the original, so misplaced or disorganized content remains misplaced or disorganized. Also, backing up all data files requires substantial memory capacity to copy numerous files that are otherwise already preserved elsewhere. Application specific files, for example, originally loaded onto the computer from a compact disc (CD) are already archived on the CD and therefore do not need to be backed up.

The necessary storage capacity for a complete backup can be obtained with writable data storage media, such as hard disc drives (HDDs), however, these require device installation and software set-up when first connected to a system. In order to complete these steps, a user may have to provide information about the existing system, which the user may not readily know. Also, the user may have to make decisions regarding the configuration of the device and the backup software. The number of steps involved with installation and set-up, as well as the complexity of some of the steps, dissuades many users from bothering with backup applications. The expense of a writable data storage media with enough capacity to perform a complete backup can also dissuade users from performing complete backups. Furthermore, some users, having bought and installed the necessary storage capacity, are dissuaded from performing frequent backups due to the length of time the system is tied up while performing a complete backup.

Alternately, a user can manually select a set of files from a directory and copy the selected files to a storage device. While this alternative may allow usage of a smaller memory device that does not require installation and set-up steps, manually selecting files is time-consuming. Also, manually selecting files creates the possibility of an accidental omission of some files.

Digital content can also be uploaded to an on-line storage service. On-line storage services provide several advantages including substantial storage capacities and the ability to access data files from remote locations. On-line storage services, for data backup purposes, not only fail to provide any automated backup applications, but also require significant user involvement to select an appropriate on-line storage system from the various alternatives, set up an account with the chosen system, configure the account with user identification, password, and payment information, select between various service options offered by the system, and so forth. Additionally, this approach suffers from many of the same drawbacks described above. A complete backup would still be no better organized than the original system, and depending on the data transmission rate for uploading files, may take an unreasonable length of time. A manually selected set of files would be just as time-consuming to determine, and just as likely to include accidental omissions.

What is needed, therefore, is the ability to selectively backup digital content in a manner that is both inexpensive and convenient.

SUMMARY

An exemplary data backup system of the invention comprises a USB flash drive. The USB flash drive includes a USB interface, a flash memory, and an emulation component in communication between the flash memory and the USB interface. The emulation component includes logic configured to represent the flash memory as an auto-launch device. The flash memory includes computer-readable instructions comprising a backup application configured to selectively copy data files from a data source to a networked storage, such as a server of a commercial service provider. In some embodiments the backup application is further configured to allow a user to specify an address of the networked storage, while in other embodiments the backup application is further configured with a predetermined address of the networked storage.

Methods for backing up data stored on a data source are also provided. An exemplary method comprises providing a response to an inquiry from the data source, where the response identifies a flash memory of a USB flash drive as being an auto-launch device. The response is provided through a USB interface of the USB flash drive to the data source. The method further comprises providing a backup application from the flash memory of the USB flash drive to the data source, the backup application being configured to selectively copy data files stored on the data source to a networked storage. In some embodiments, the response identifying the flash memory as being an auto-launch device identifies the flash memory as a CD drive including a CD medium or a DVD drive including a DVD medium. In some embodiments, providing the backup application includes receiving auto-launch device commands from the data source, translating the auto-launch device commands to flash memory commands, and sending the flash memory commands to the flash memory; and in these embodiments providing the backup application further includes receiving flash memory responses from the flash memory, translating the flash memory responses into auto-launch device responses, and sending the auto-launch device responses to the data source.

Another exemplary method consists of connecting a USB flash drive to a USB interface of a data source, wherein an operating system of the data source automatically launches a backup application stored on the USB flash drive, and wherein the backup application copies data files from the data source to a networked storage.

Still another exemplary method comprises detecting a connection of a device to a USB interface, the device being a USB flash drive. The method further comprises automatically launching a backup application stored on the USB flash drive connected to the data source. Here, the backup application is configured to find data files on the data source according to a criterion. The method also comprises copying the data files to a networked storage specified by the backup application.

Business methods are also provided herein. One exemplary method comprises distributing a USB flash drive including computer-readable instructions comprising a backup application configured to selectively back up data files from a data source to a server across the Internet. The method further comprises maintaining the server to store the backed up data files, and charging a fee based on the backed up data files. Charging the fee based on the backed up data files can include charging a fee for storing the backed up data files, for accessing the backed up data files, or for using the backed up data files, according to various embodiments. As one example, using the backed up data files can include printing the backed up data files.

DETAILED DESCRIPTION OF THE INVENTION

A data backup system is provided for personal, as well as commercial, applications. The data backup system of the present invention allows files to be selectively copied from a data source, such as a personal computer, to a storage device according to some criteria such as file type. For example, the system can be configured to backup audio files having recognized music file extensions such as .mp3 and .wav, or image files having recognized image file extensions such as .jpg, .pct, and .tif. The data backup system, according to some embodiments, stores a backup application that automatically launches when the data backup system is connected to the data source. The backup application can be configured to require little or no user input to perform the backup process.

The data backup system can take a number of different forms. One example is an appliance that includes both the backup application and sufficient storage capacity for copied files. Another example is a device that includes the backup application and an interface for connecting sufficient storage capacity in the form of a storage device such as an external HDD or flash memory device. In both examples, the system includes an emulation component. The emulation component makes the portion of the data backup system that contains the backup application appear to the data source as if it were of a particular device type. More specifically, the backup application portion of the data backup system is represented as being one of a class of storage devices referred to herein as "auto-launch devices." Emulating an auto-launch device allows the data backup system to take advantage of automatic execution capabilities of certain operating systems so that the backup application will automatically be executed when the device is connected to a data source running the operating system.

Figure 1:
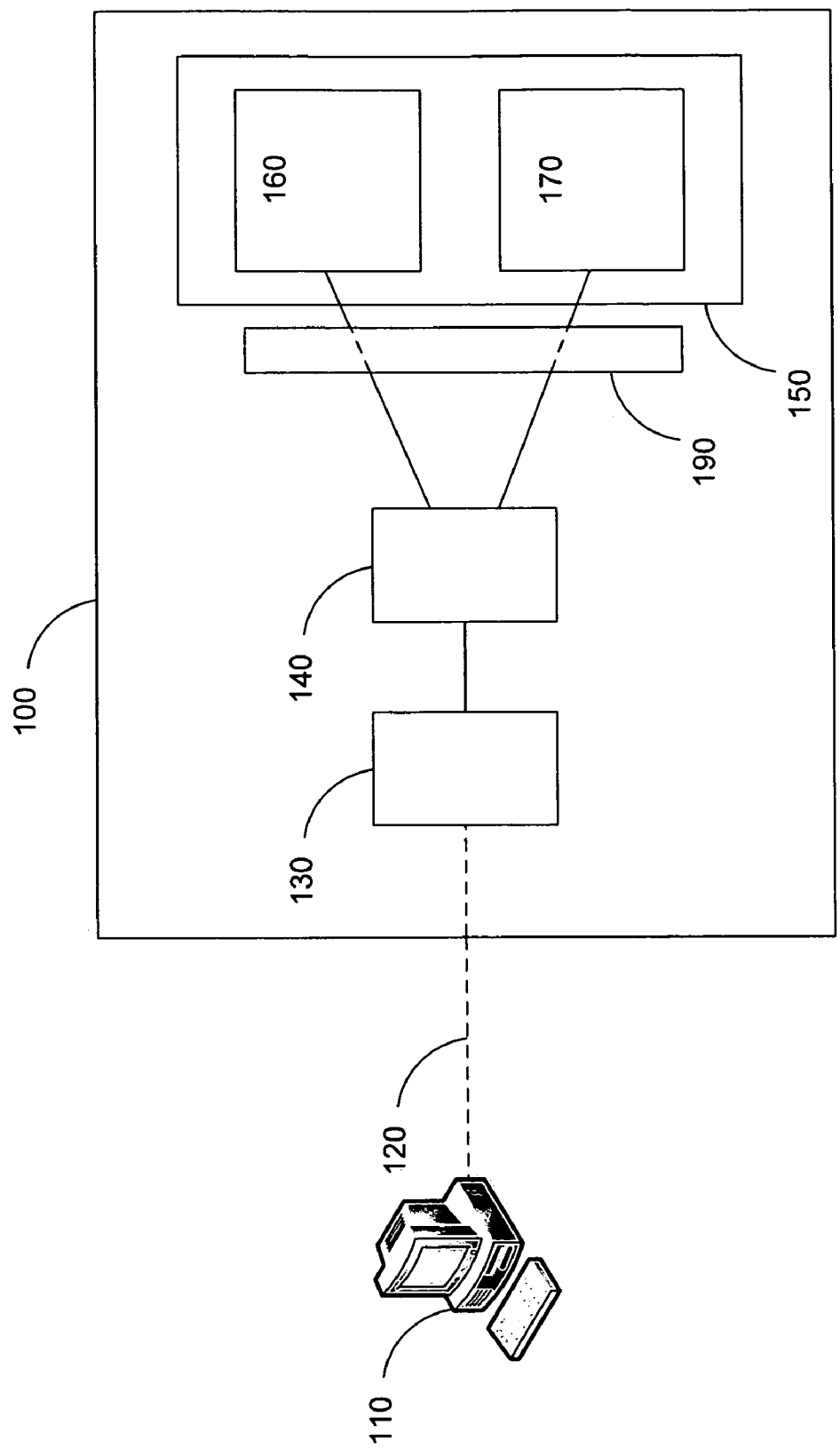
FIG. 1 is a schematic representation of a data backup system according to an exemplary embodiment of the present invention.

FIG. 1 provides a schematic representation of an exemplary embodiment of a data backup system 100 connected to a data source 110 by a connection 120. The data source 110 can be, for example, a personal computer (PC), a Macintosh computer (Mac), or a Personal Digital Assistant (PDA) on which data resides. The data source 110 can also comprise a server, a settop box, a television, a cellular telephone, a Smartphone, a digital still camera or video camera, a scanner, a digital music or video player, a game console, or a Personal Video Recorder (PVR). Preferably, the data source 100 includes an operating system (OS), such as Windows XP, that includes an automatic application launching function, as discussed in more detail elsewhere herein. Other suitable operating systems include MacOS, PalmOS, Linux, and Unix, for example. The connection 120 between the backup system 100 and the data source 110 can be essentially any data transfer mechanism such as an optical or electrical cable, a wireless link, or a network connection. The connection 120 is shown with a dashed line in FIG. 1 to indicate that the connection 120 need only be temporary.

As shown in FIG. 1, the backup system 100 comprises a communication interface 130, an emulation component 140, and a storage device 150 that includes a first logical storage area 160 and second logical storage area 170. The communication interface 130 allows the data source 110 to communicate with the emulation component 140 of the backup system 100 according to a communication protocol. The communication interface 130 can be, for example, USB, FireWire, or a wireless interface such as infrared, Bluetooth, or WiFi.

It will be appreciated that the backup system 100 can include a plurality of communication interfaces 130, of the same or of different types, to accommodate multiple and/or different data sources 110. Depending on the type of communication interface 130, the communication interface 130 can include a communication port through which the connection 120 to the data source 110 is made. For instance, a USB communication interface 130 can include a USB communication port, and a FireWire communication interface 130 can include a FireWire communication port. Alternatively, the communication interface 130 can include a wireless antennae or an infrared transmitter/receiver unit for sending and receiving infrared signals.

The storage device 150 comprises a writable data storage medium and can be, for example, a HDD that has been partitioned into at least two logical storage areas. In this instance, each logical storage area is a partition of the HDD. Suitable HDDs for the storage device 150 include 1.0 inch, 1.8 inch, 2.5 inch, and 3.5 inch hard drives having capacities of 20 to 60 gigabytes (GB) or more. Other suitable storage devices 150 that include rewritable media are solid-state memory devices, such as SD memory cards and CF memory cards. The storage device 150 can also be an optical device such as a CD drive or a DVD drive where the writable data storage medium within such an optical storage device 150 can be either a write-once medium, such as a Compact Disc-Recordable (CD-R), DVD-Recordable (DVD-R or DVD+R), or a rewritable medium such as a Compact Disc-Rewritable (CD-RW), or DVD-Rewritable (DVD-RW or DVD+RW). As used herein, a "CD medium" refers to a CD of any CD format, and a "DVD medium" refers to a DVD of any DVD format.

The storage device 150 can also be implemented by two different devices, one dedicated to each of the two logical storage areas 160, 170. For example, the first logical storage area 160 can be implemented by a CD drive with any CD media, while the second logical storage area 170 is implemented by a HDD. In a further example, the first logical storage area 160 can be implemented by a solid state memory while the second logical storage area 170 is implemented by an optical device with a writable data storage medium. In this further example, the two different devices could be contained within a common housing. It will be understood that the device types, form factors, and capacities provided herein are merely exemplary and not intended to be limiting.

In some embodiments, the backup system 100 further comprises a memory device interface 190 that allows the first and second logical storage areas 160 and 170 to communicate with the emulation component 140. In these embodiments the memory device interface 190 is of a type that is appropriate to the type of storage device 150. For instance, an Integrated Drive Electronics (IDE) interface 190 can be used with an IDE HDD storage device 150, and a Small Computer System Interface (SCSI) interface 190 can be used with a SCSI HDD storage device 150. Alternately, the memory device interface 190 can be a SD memory card host interface where the storage device 150 is a SD memory card. The interface 190 can also be a wireless interface such as infrared, WiFi, and Bluetooth. The memory device interface 190 can be implemented in the backup system 100 by an integrated circuit (IC) chip or through the use of discrete components. The memory device interface 190 is integrated into the memory device 150, in some embodiments. It will be appreciated that in the embodiments noted above that employ multiple storage devices 150, the backup system 100 can include multiple memory device interfaces 190 as appropriate.

The first logical storage area 160 represents a logical area of the memory device 150 that is meant to be inaccessible to the user and safe from accidental erasure. The first logical storage area 160 can contain, for example, a backup application, system files, drivers, and other setup and configuration software. The first logical storage area 160 is represented to the data source 110 by the emulation component 140 as being an auto-launch device. As used herein, auto-launch devices are those devices that will trigger the automatic execution functionalities of certain operating systems, such as the Auto-Run function of the Microsoft Windows operating system. Examples of device types that will trigger AutoRun of Windows include CD and DVD drives when a CD or DVD medium is contained therein. In these examples, the Windows AutoRun functionality is triggered either when the CD/DVD is placed in the CD/DVD drive already connected to the data source 110, or when the CD/DVD drive, already containing the CD/DVD medium, is connected to the data source 110.

The second logical storage area 170 represents a logical area of the memory device 150 that is dedicated to storing backed-up data. Accordingly, the emulation component 140 represents the second logical storage area 170 to the data source as being a device type that includes a writable data storage medium. The second logical storage area 170 can be represented as a HDD, CF, or a SD memory card, for example. In some embodiments, the second logical storage area 170 can be represented as the same type of device as the storage device 150. In other embodiments the second logical storage area 170 can be represented to be a different device type than the storage device 150.

The emulation component 140 provides certain functions to the backup system 100 and can be implemented through logic such as software, firmware, hardware, or any combination of these. It will be understood that within an embodiment different functions of the emulation component can be implemented with different forms of logic. Thus, while one function of the emulation component 140 is implemented through firmware, for example, another function can be implemented through software.

In one embodiment, the emulation component 140 includes an IC. For example, the emulation component 140 can be implemented using software, firmware, hardware, or some combination thereof, incorporated in a USB controller chipset. In some USB-specific embodiments, the emulation component 140 implements some or all of a number of layered industry standards. Examples of such standards include USB Specification—Revision 2.0, USB Mass Storage Class—Bulk Only Transport—Revision 1.0, SCSI Primary Commands-3 (SPC-3), SCSI Block Commands-2 (SBC-2), Multimedia Commands-4 (MMC-4), and AT Attachment with Packet Interface-6 (ATA/ATAPI-6). It should be noted that in some embodiments the emulation component 140 may only support subsets of the commands of these industry standards.

Functions provided by the emulation component 140 can include representing the first logical storage area 160 as an auto-launch device and representing the second logical storage area 170 as a device including a writable data storage medium. Accordingly, the data source 110 will recognize the data backup system 100 as two attached devices when connected to the backup system 100. It should be noted, however, that in some embodiments the contents of these two devices are not accessible to the user of the data source but are accessible by the backup application which is configured with appropriate application programming interface (API) calls. This serves to protect the contents of both the first and second logical storage areas from accidental modification or erasure. To access the backed up data from the second logical storage area 170 in some embodiments, the data backup system 100 restores the data to the data source or copies the data to yet another device. In other embodiments, the virtual device that represents the second logical storage area 170 is accessible to the user while the virtual device that represents the first logical storage area 160 is not accessible. In these embodiments, the user is allowed direct access to the contents of the second logical storage area 170 but not the first logical storage area 160.

Another function that can be provided by the emulation component 140 is translating commands and responses between formats, such as between the command sets for a HDD and a CD drive. In this way, when the data source 110 sends a command to the backup system 100 addressed to the auto-launch device (as the first logical storage area 160 is represented to be), the emulation component 140 translates the command from an auto-launch device format to the appropriate format for the storage device 150, before sending the command to the first logical storage area 160. Similarly, responses from the first logical storage area 160, in the format of the storage device 150, are translated into the auto-launch device format and sent to the data source 110 so the response appears to have come from an auto-launch device.

It should be noted that translation between CD drive and HDD formats is but one example, and in some embodiments the emulation component 140 can implement one or more analogous format translations. As used herein, a "storage device command" refers to a command in an appropriate format for the specific storage device, and a "storage device response" refers to a response in the same format. As a specific example, an "auto-launch device command" refers to a command in an appropriate format for a specific auto-launch device, and an "auto-launch device response" refers to a response in the same format.

Still another function that can be provided by the emulation component 140 is to pass commands and responses between the data source 110 and the second logical storage area 170. When the commands received by the emulation component 140 are already in the proper format for the storage device 150, the emulation component 140 does not have to translate commands or responses. Here, the emulation component 140 receives commands from the data source 110 addressed to the device that includes the writable data storage medium and passes the commands to the second logical storage area 170. In a similar fashion, responses are relayed back to the data source 110 without translation. It will be appreciated that the emulation component 140 can be configured to represent the second logical storage area 170 as being of a different type of device than the memory device 150. In these embodiments, the emulation component 140 is configured to translate between the formats of the memory device 150 and the device type of the representation of the second logical storage area 170.

Figure 2:
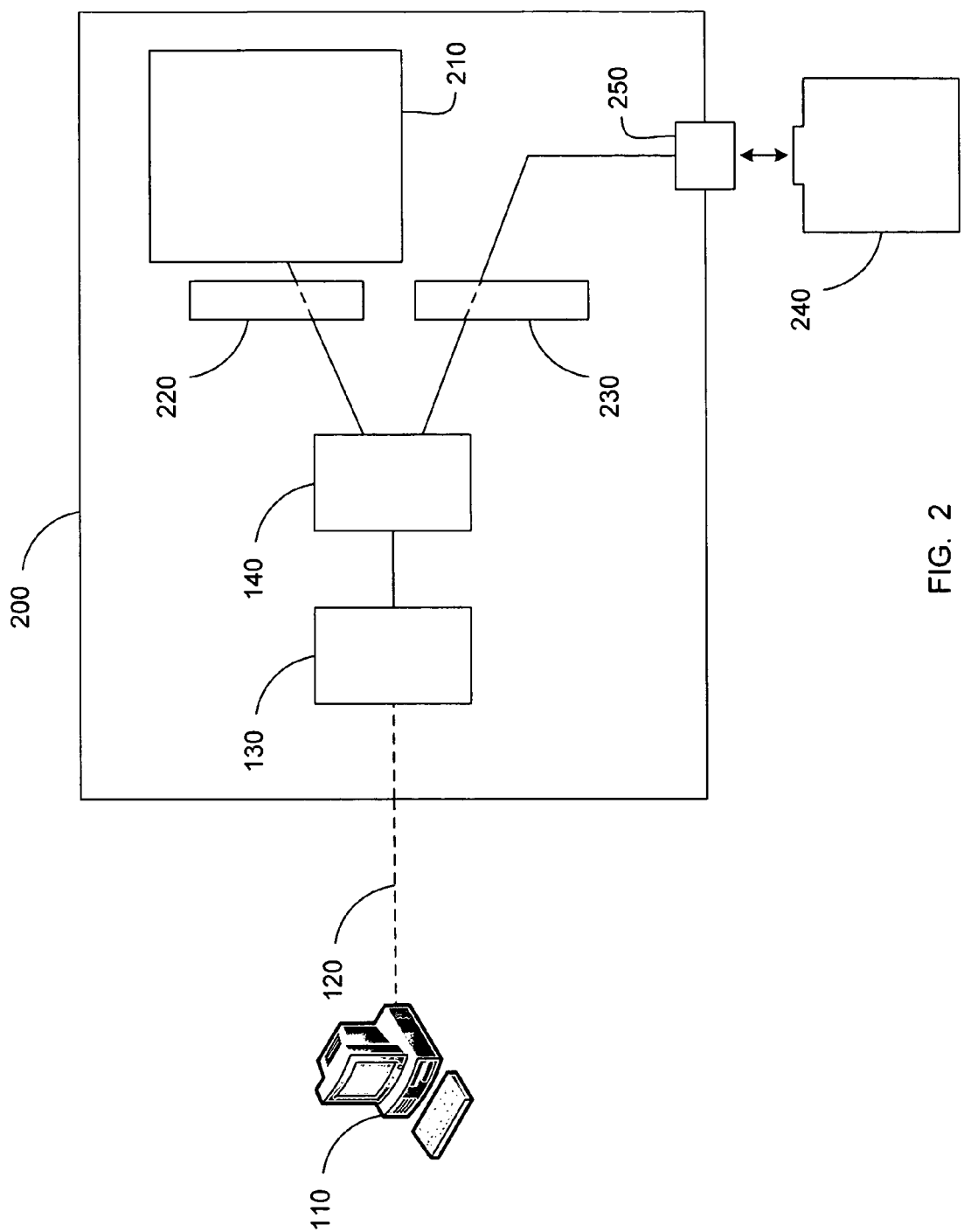
FIG. 2 is a schematic representation of a data backup system according to another exemplary embodiment of the present invention.

FIG. 2 provides a schematic representation of another exemplary embodiment of a data backup system 200 that, like the data backup system 100, is connected to the data source 110 by the connection 120. Also like the data backup system 100, the backup system 200 comprises the communication interface 130, and the emulation component 140. In this embodiment, the backup system 200 also comprises storage device 210 including a writable data storage medium and an appropriate memory device interface 220. Since the writable data storage medium of the storage device 210 only needs to include enough memory capacity to store a backup application and the like, the backup system 200 can be of a fairly small form factor, such as pocket-sized or a dongle, or be embedded in some other device configuration such as a dock or a cradle.

The data backup system 200 can also comprise a removable storage device interface 230 to allow a removable storage device 240, including a writable data storage medium, to be attached externally to the data backup system 200 by way of a communication port 250. The removable storage device interface 230 provides communication between the emulation component 140 and the removable storage device 240. In some embodiments the removable storage device interface 230 is configured to support a removable device with an integrated medium such as a flash memory device or a HDD. In other embodiments, the removable device can be one that accepts removable media, such as a CD drive.

It will be appreciated that the removable storage device interface 230 is optional as the copied files do not necessarily have to be stored to a memory device that is associated with the data backup system 200. Alternately, the backup application can direct copied files to be stored to an existing internal or external drive of the data source or to a networked drive. In still another option, the backup application can send copied files over an Internet connection to be stored at a web-based storage facility.

It should be noted that the backup systems 100, 200 can include a display or other visual indicator such as a light emitting diode (LED) to show files being copied, for instance, though some embodiments do not include the display to lower the cost and increase the durability of the backup systems 100, 200. The backup systems 100, 200 can run off of a battery, an external power source (e.g., an AC power outlet), or off of power supplied by the data source 10. In some embodiments, the connection 120 is a cable that is part of the backup system 100, 200. The backup systems 100, 200 can also be configured as a cradle designed to receive the removable storage device 240 or the data source 110 where the data source 110 is a consumer electronic device such as a digital camera.

Figure 3:
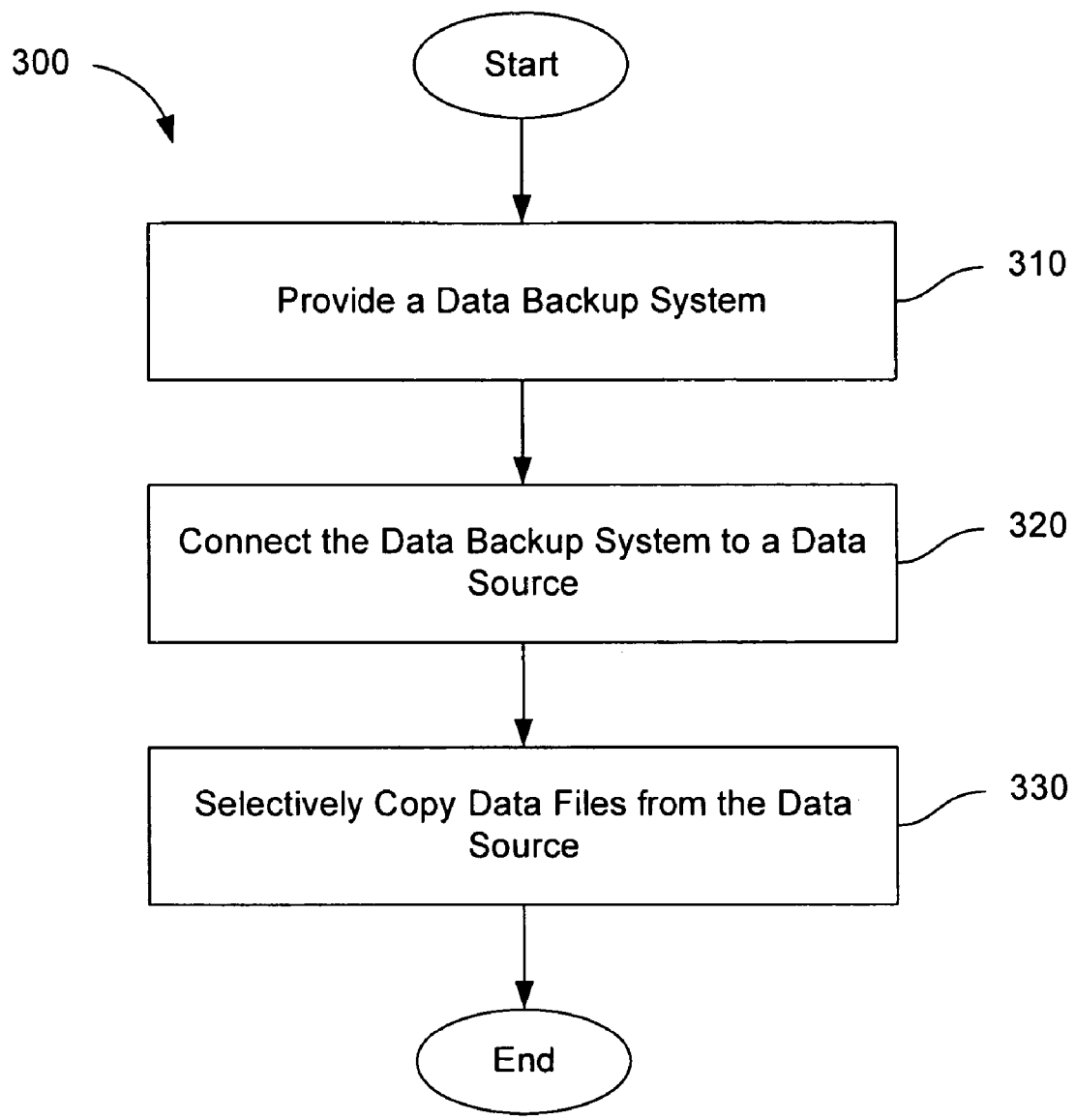
FIG. 3 is a flow-chart representation of a method for backing up data files on a data source according to an exemplary embodiment of the present invention.

FIG. 3 is a flow-chart representation of an exemplary method 300 for backing up data files from a data source. The method 300 comprises providing 310 a data backup system including a storage device storing a backup application, connecting 320 the data backup system to the data source to automatically launch the backup application, and selectively copying 330 the data files from the data source.

Providing 310 the data backup system can include providing data backup system 100 or data backup system 200, for example. In those embodiments in which the data backup system 200 is provided, providing 310 the data backup system 200 can include, for example, connecting a removable storage device 240 to the communication port 250. Where the removable storage device 240 is, for example, a SD or CF memory card, connecting the removable storage device 240 to the communication port 250 can include inserting the memory card into the communication port 250. Alternately, where the removable storage device 240 is a HDD, connecting the removable storage device 240 to the communication port 250 can include coupling the communication port 250 to the removable storage device 240 with a connection such as a cable or a wireless link.

With reference to data backup systems 100, 200, connecting 320 the data backup system 100, 200 to the data source 110 can include coupling the communication interface 130 to the data source 110 with the connection 120. Connecting 320 the data backup system to the data source also includes the data source recognizing the data backup system as two new devices. For example, some operating systems periodically query unused ports for newly attached hardware. An exemplary process by which the data backup system 100, 200 can be recognized by the data source 110 as being two attached devices is described below with respect to FIG. 4.

Connecting 320 the data backup system to the data source automatically launches a backup application. Operating systems that include an automatic execution function, such as the AutoRun capability of the Windows operating system, can execute applications that are resident on an auto-launch device. Here, the automatic execution function of the data source's operating system recognizes the backup application as an application to be launched, and automatically launches the backup application to run on the data source.

Connecting 320 the data backup system to the data source can also comprise translating commands and responses between device formats as communications are passed between the data source and the data backup system, as discussed above with respect to the functionality of the emulation component 140. Thus, for example, CD read commands sent to the backup system 100 are translated to HDD read commands before being sent to the first logical storage area 160.

Selectively copying 330 the data files from the data source can include running the backup application on the data source, where the backup application is configured to search one or more storage devices associated with the data source. The backup application can, in some embodiments, search directories of internal storage devices, external storage devices, and network drives that are accessible to the data source. The backup application selectively copies files to a storage device including a writable data storage medium such as the second logical storage area 170 or the removable storage device 240.

The backup application selects files that meet at least one criterion, such as file type (e.g., .jpg) or type of content (e.g., audio files). The backup application can also find files that meet at least one of several criteria. Other examples of types of content include e-mails, business application data (e.g., Accpac and Simply Accounting files), digital video files, ebook files, contacts files, calendar files, text files, tasks files, settings files, bookmark files, and password files. Another criterion, in some embodiments, is whether a file has been previously backed up. Yet another criterion can be a particular date or a range of dates. The backup application, in some embodiments, finds files that meet the criteria by searching e-mail attachments and files embedded within other files, such as compressed files within a .zip file. The backup application can find files that are stored directly on the data source, or additionally on associated peripheral devices and networks.

The backup application can, in some embodiments, create a file path or directory structure on the writable data storage medium of the data backup system to indicate the location where a copied file was located on the data source. In other embodiments, the backup application creates a new directory structure based on chronological order, alphabetical order, file size, or some other criteria. Another alternative is for the backup application to create a monolithic file that includes all of the backed up files. Yet another alternative is for the backup application to store on the writable data storage medium the backed up files in a common directory (i.e., a flat structure) and to create an index (e.g. an XML index) that stores the information on file locations. In these embodiments, when the backed up files are restored the index is used to re-create the directory structure on the data source.

It will be appreciated that according to the method 300, user involvement can be reduced to simply making a physical connection between a data backup system and a data source. While user involvement can be reduced to one or more simple operations, it will be appreciated that options can be provided to the user through a graphical user interface (GUI) provided by the backup application on a display device of the data source. In this way the user, if desired, can customize the backup process by specifying search criteria such as a type of content or a file type to be copied. Additionally, the user can limit the scope of the backup process by drive, directory, folder, file type, file size, or date/time stamp, or the user can deselect a type of content or a specific file, drive, directory, or folder such as a temporary folder or an Internet Explorer directory.

As noted, selectively copying 330 the data files from the data source can include running the backup application on the data source. In addition to the above functions of the backup application, the backup application can also be configured to perform the following functions as part of selectively copying 330 the data files. For example, the backup application can wait a predetermined length of time and then repeat the backup process so long as the backup system remains connected to the data source 110. The backup application can also perform a self-diagnostic routine at predetermined intervals. The backup application can also be configured to wait for a predetermined period of time before performing an automatic backup to provide the user an opportunity to customize the backup process. Additionally, the backup application can be configured to selectively copy 330 the data files only upon a user command, rather than automatically. The user command can be entered through the GUI on the data source, or can be provided by a button or switch on the data backup system. Alternately, the backup application can be configured to selectively copy 330 the data files whenever a removable storage device 240 is connected to the communication port 250.

Copying 330 the data files, in some embodiments, includes determining whether the data source has been previously paired with the data backup system (e.g., the data source was previously backed up with the data backup system). This can include, for example, searching for a marker that was previously left on the data source, or comparing a marker saved on the data backup system with an identifier of the data source such as a volume label. The marker allows the backup application to recognize the data source. In some embodiments, the backup application determines a course of action based on whether the data source has been previously paired with the data backup system and if so, whether the data backup system already stores data associated with the data source. For instance, the course of action can be an automatic backup of the data source, either full or incremental, a restoration of backed up data to the data source, or a query to the user to make a selection between these or other alternatives.

Figure 4:
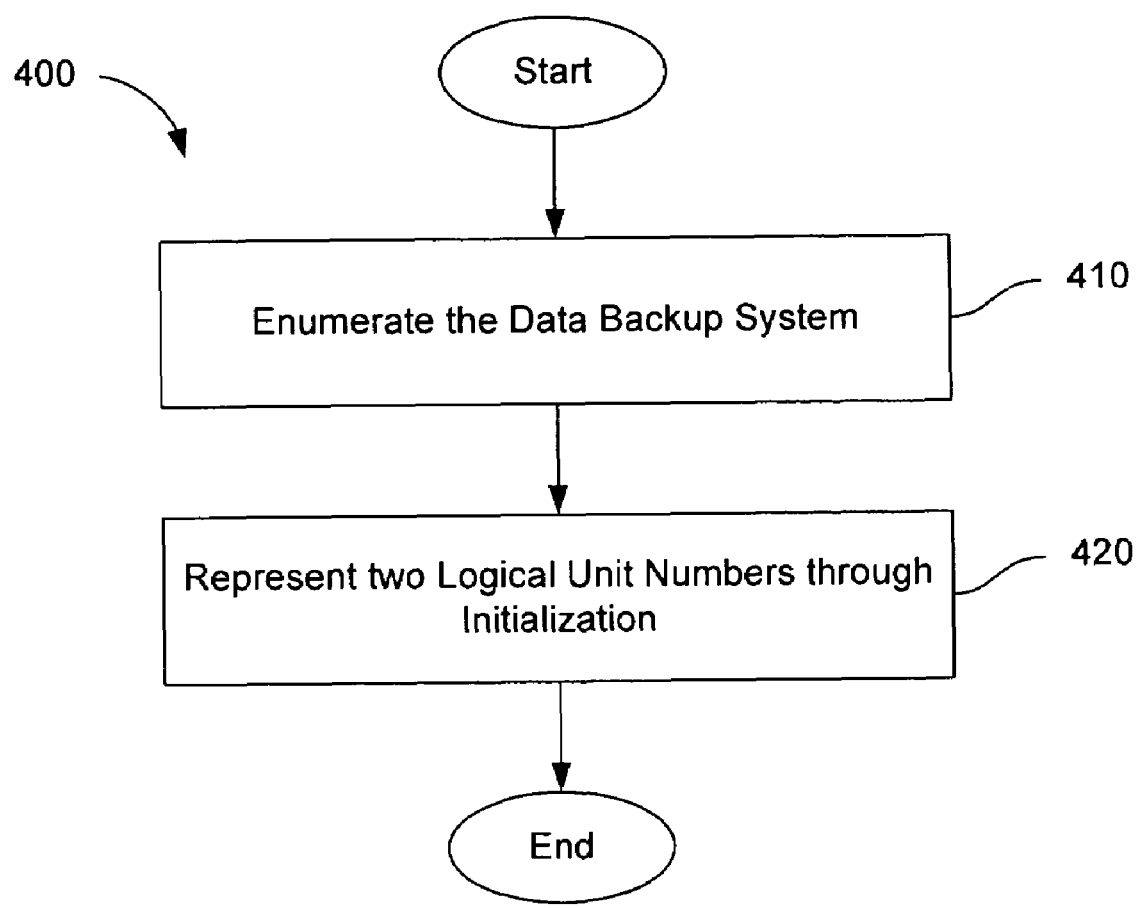
FIG. 4 is a flow-chart representation of a process by which a data backup system can be recognized by the data source as being two attached devices according to an exemplary embodiment of the present invention.

FIG. 4 is a flow-chart representation of an exemplary method 400 by which the data backup system, once detected, becomes recognized as two attached devices by the data source. Although this exemplary method 400 is described with reference to USB protocols, it will be understood that other protocols such as FireWire follow analogous processes. The method 400 comprises the data source enumerating 410 the data backup system, followed by the emulation component of the data backup system representing 420 two Logical Unit Numbers (LUNs) through initialization.

Enumerating 410 the data backup system is performed to identify the newly attached hardware, in this case the data backup system, and how the hardware is configured for communication. Enumerating 410 comprises the data source assigning a unique device number and querying the data backup system for a device descriptor. The emulation component responds by providing a device descriptor to the data source. Enumerating 410 further comprises the data source setting an address for the data backup system. Once the address has been set, the data backup system obtains communication frames assigned to the address. Enumerating 410 can also comprise the data source requesting and receiving detailed device information from the data backup system, specifically the emulation component, such as class, subclass, and protocol.

Enumerating 410 also comprises the data source starting an appropriate USB mass storage class driver, and the USB mass storage class driver requesting the number of LUNs from the data backup system with a "GET MAX LOGICAL UNIT NUMBER" command. Enumerating 410 also comprises the data backup system, and more specifically the emulation component, responding to the "GET MAX LOGICAL UNIT NUMBER" command by communicating two LUNs to the data source.

Representing 420 the two LUNs through initialization comprises the emulation component receiving a number of SCSI commands directed to each LUN from the data source. The emulation component handles each LUN independently. The emulation component responds to those SCSI commands that it recognizes, and generates a standard error condition in response to SCSI commands that are not recognized. Each SCSI command, and any errors that are generated, are typically handled before the next SCSI command is issued to either LUN. It will be understood that the sequence of SCSI commands sent to the LUN representing a storage device including a writable data storage medium can be different from those sent to the LUN representing an auto-launch device. Additionally, SCSI commands, or a sequence of SCSI commands, may be repeated multiple times by the data source, and sequences of SCSI commands directed to the two LUNs can be interlaced.

For both LUNs, the sequence of SCSI commands starts with the USB mass storage class driver issuing an "INQUIRY" command to identify the device type. The emulation component returns a response to represent a storage device, such as second logical storage area 170 (FIG. 1), as a storage device that can include a writable data storage medium. A response of "0x00," for example, indicates that the storage device is a HDD. Similarly, the emulation component returns a response to represent a storage device, such as first logical storage area 160 (FIG. 1) as an auto-launch device. A response of "0x05," for instance, indicates that the auto-launch device is a CD drive. The storage device that can include a writable data storage medium can additionally be marked as either "removable" or "non-removable," while the auto-launch device can be marked as "removable." After this point, the sequence of SCSI commands for the two LUNs diverge. It will be appreciated that the order of SCSI commands in the sequences described below are exemplary, and the order of the SCSI commands will vary with different data sources. Also, in some instances one or more of the SCSI commands provided below are omitted, and/or other SCSI commands are included.

An exemplary sequence of SCSI commands directed to the storage device that includes the writable data storage medium continues with a "READ FORMAT CAPACITIES" request that the data source uses to determine whether the writable data storage medium is unformatted. Ordinarily, the medium of the storage device being represented is already formatted, and the emulation component responds accordingly. Otherwise, the data source will attempt to format the medium of the storage device. Next, the data source issues a "READ CAPACITY" request to identify the capacity of the writable data storage medium and its block size, and the emulation component returns this information as well. A "READ(10)" command is issued to read the first block on the writable data storage medium. The first block has a logical block addressing (LBA) value of zero (LBA=0) and contains the Master Boot Record (MBR), which itself contains the partition table for the writable data storage medium. The emulation component responds with the contents of the requested block.

A "MODE SENSE(6)" command is then used to extract the capabilities of the storage device including the writable data storage medium, such as whether the storage device contains a disk cache. The emulation component replies as appropriate to the capabilities of the storage device being represented. Another "READ(10)" command is issued to recover the first block of the file system that contains the root directory. The first block of the file system can be located at LBA=0x3F, for example, but can vary depending on the particular type of file system being represented. The emulation component returns the first block of the file system. Finally, the data source can issue a "TEST UNIT READY" request before reading the full contents of the root directory, etc. Here, the emulation component responds affirmatively so that the data source will regard the storage device that includes the writable data storage medium as operational. The data source thereafter issues more read/write requests as necessary.

An exemplary sequence of SCSI commands directed to the auto-launch device continues with a "GET CONFIGURATION" request to obtain information about the capabilities of the auto-launch device and its ability to read or write different types of optical media, e.g., CD-R, CD-RW, DVD-R, DVD+R, DVD-RW, DVD+RW, etc. The emulation component responds with capabilities that are appropriate for the auto-launch device being represented to the data source. This can be followed by a "READ CAPACITY" request to discover if there is a medium present in the auto-launch device. The emulation component is configured to respond by failing the initial attempt. In response, the data source will issue a "REQUEST SENSE" command to access the extended error information. In the reply, the emulation component sets the "Sense Key" to "UNIT ATTENTION," and sets the "Additional Sense Code" to "POWER ON." The data source will then repeat the "READ CAPACITY" request, and the emulation component will respond with a capacity, such as the size of the first logical storage area 160 (FIG. 1).

To learn what types of status change events the read-only media device supports, the data source issues an initial "GET EVENT STATUS NOTIFICATION" request, and the emulation component responds with a set of coded status fields. The data source can then repeat the "GET EVENT STATUS NOTIFICATION" request, with a field set to a status entry to be checked. If the operational status field is enabled, for example, the emulation component will respond with an operational change event, and a status code representing a feature change. This response can trigger the data source to issue further "GET CONFIGURATION" request(s), to discover which feature, if any, has changed.

The data source can also issue a "MODE SENSE(10)" request for Page Code (0x2A), known as the "MM Capabilities and Mechanical Status Page." The emulation component will respond with information that is typical for a simple auto-launch device that includes read-only support for CD-R and CD-RW media. This echoes the information that is returned in response to the "GET CONFIGURATION" request.

At this point, the data source can issue a "TEST UNIT READY" command. This triggers two sequences of request/response events in the emulation component that can support the automatic execution functionality of different operating systems. The commands in the two sequences can be interlaced, and the events will remain pending until the emulation component has passed through all of the expected states. As outlined below, both sequences are typical for an operating system such as Windows XP. The sequences, below, do not account for the number of times that a request, or a sequence of requests, can be repeated. Also, the particular sequence of events can vary depending on the type and version of the operating system executing on the data source. Additional or substitute commands can also be issued.

The first sequence comprises a series of "TEST UNIT READY" commands from the data source to the auto-launch device. The emulation component is configured to fail the first request. The data source then sends a "REQUEST SENSE" command to obtain the extended error information, and the emulation component sets the sense key to "NOT READY," with an additional sense code of "MEDIUM NOT PRESENT." The data source then repeats the "TEST UNIT READY" command, which the emulation component again fails. The data source again sends a "REQUEST SENSE" command and the emulation component responds with a sense key set to "UNIT ATTENTION," and an additional sense code of "MEDIUM MAY HAVE CHANGED." All subsequent "TEST UNIT READY" commands are typically responded to without error.

The second sequence comprises a series of "GET EVENT STATUS NOTIFICATION" requests from the data source to the auto-launch device. Following the first "TEST UNIT READY" command that triggers the first sequence, the data source issues a "GET EVENT STATUS NOTIFICATION" request with the operational change field enabled. The emulation component responds with an operational change event and a status code representing a feature change. On the following "GET EVENT STATUS NOTIFICATION" request the media status field is enabled. The emulation component responds with a media event, a status code representing new media, and a flag set to indicate that the media is present. On all subsequent "GET EVENT STATUS NOTIFICATION" requests where the media status field is enabled, the emulation component responds with a media event and with the media present flag set, but the status code will not indicate new media. In the case where a "GET EVENT STATUS NOTIFICATION" request is issued, and the expected status field is not enabled, the emulation component responds as appropriate for the current state of that event.

At the end of either or both of these sequences, the data source can send a "READ TOC/PMA/ATIP" request to read the Table Of Contents (TOC) from the medium of the auto-launch device. The TOC includes information on the number of tracks on the medium, and the start position of each. The emulation component responds with entries for a default configuration, namely, a single data track that starts immediately after the "lead-in" area. The default TOC declares that the first block of data on the medium starts at address zero. The position of a last track is fixed in the emulation component and represents the space allocated to the data on the auto-launch device, such as the backup application.

When the data source makes a read request of the auto-launch device, the emulation component automatically translates the logical address into a corresponding physical address of the storage device (e.g., first logical storage area 160 (FIG. 1)) that is being represented as the auto-launch device. In addition, where the block sizes of the storage device (e.g., a HDD partition) that is being represented as the auto-launch device (e.g., a CD drive) are different, the emulation component also translates the required amount of auto-launch device data into the appropriate number of blocks on the storage device.

After the method 400 has been completed, the data source recognizes one LUN as an auto-launch device and another LUN as a storage device including a writable data storage medium and is properly configured to communicate independently with each. Thereafter, selectively copying 330 the data files from the data source can commence. As described above, this can include the operating system of the data source automatically launching a backup application from the LUN being represented as the auto-launch device, and writing selected data from the data source to the LUN being represented as the storage device including a writable data storage medium.

Figure 5:
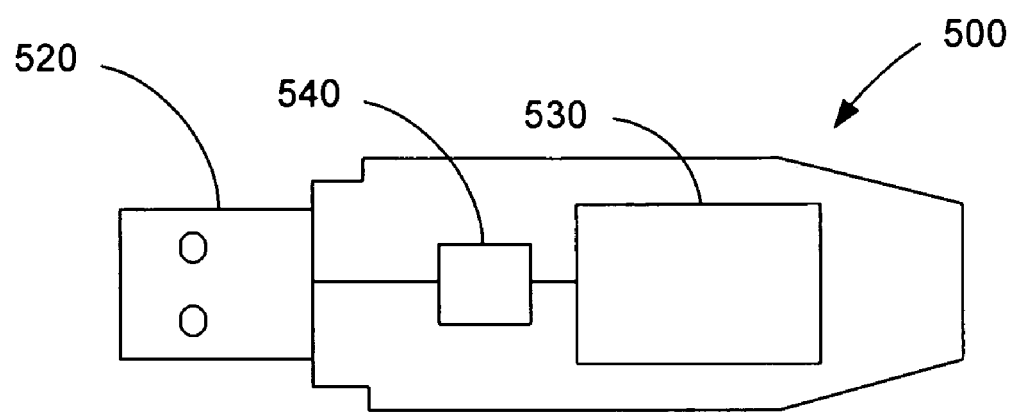
FIG. 5 is a schematic representation of a data backup system according to still another exemplary embodiment of the present invention.
Figure 6:
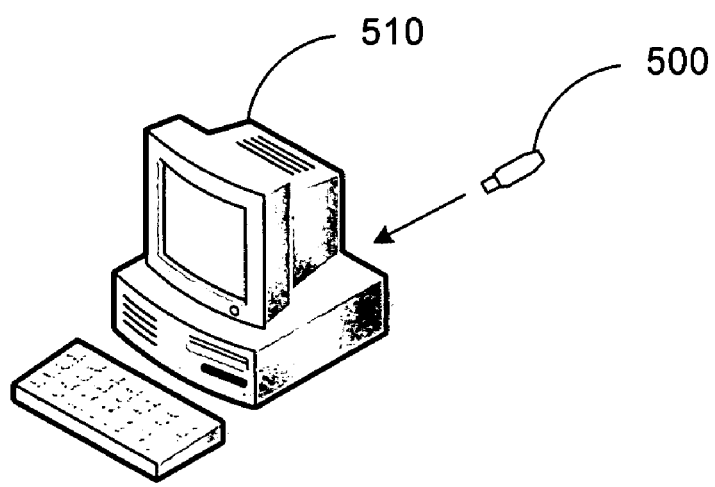
FIG. 6 is a schematic representation of a data source and the data backup system of FIG. 5.

FIGS. 5 and 6 provide schematic representations of another exemplary embodiment of a data backup system 500 that can be connected to a data source 510. The data backup system 500 can comprise a USB interface 520 to allow the data backup system 500 to connect to a USB interface (not shown) of the data source 510. The data backup system 500 can be, for example, a USB flash drive (UFD) such as a key drive, pen drive, jump drive, thumb drive, a memory stick, or the like.

The data backup system 500 can also comprise a flash memory 530 and an emulation component 540 in communication between the flash memory 530 and the USB interface 520. The flash memory 530 includes computer-readable instructions comprising, for example, a backup application. The backup application, when executed, is configured to selectively copy data files from the data source 510 to a networked storage.

Examples of networked storage include a server of a commercial service provider, Network Attached Storage (NAS), and networked drives such as a drive of a Local Area Network (LAN). In some embodiments, the backup application comprises an address of the networked storage. In these embodiments, executing the backup application causes the backup application to automatically direct the data files to the address. For example, where the backup application comprises an address of a commercial service provider, executing the backup application causes the backup application to automatically direct the data files to the commercial service provider.

Since the data backup system 500 does not comprise an auto-launch device, the data backup system 500 includes the emulation component 540. The emulation component 540 includes logic configured to represent the flash memory 520 as an auto-launch device. Accordingly, when the data backup system 500 is connected to the data source 510, the data source 510 is able to automatically launch the backup application, as described in detail above.

Figure 7:
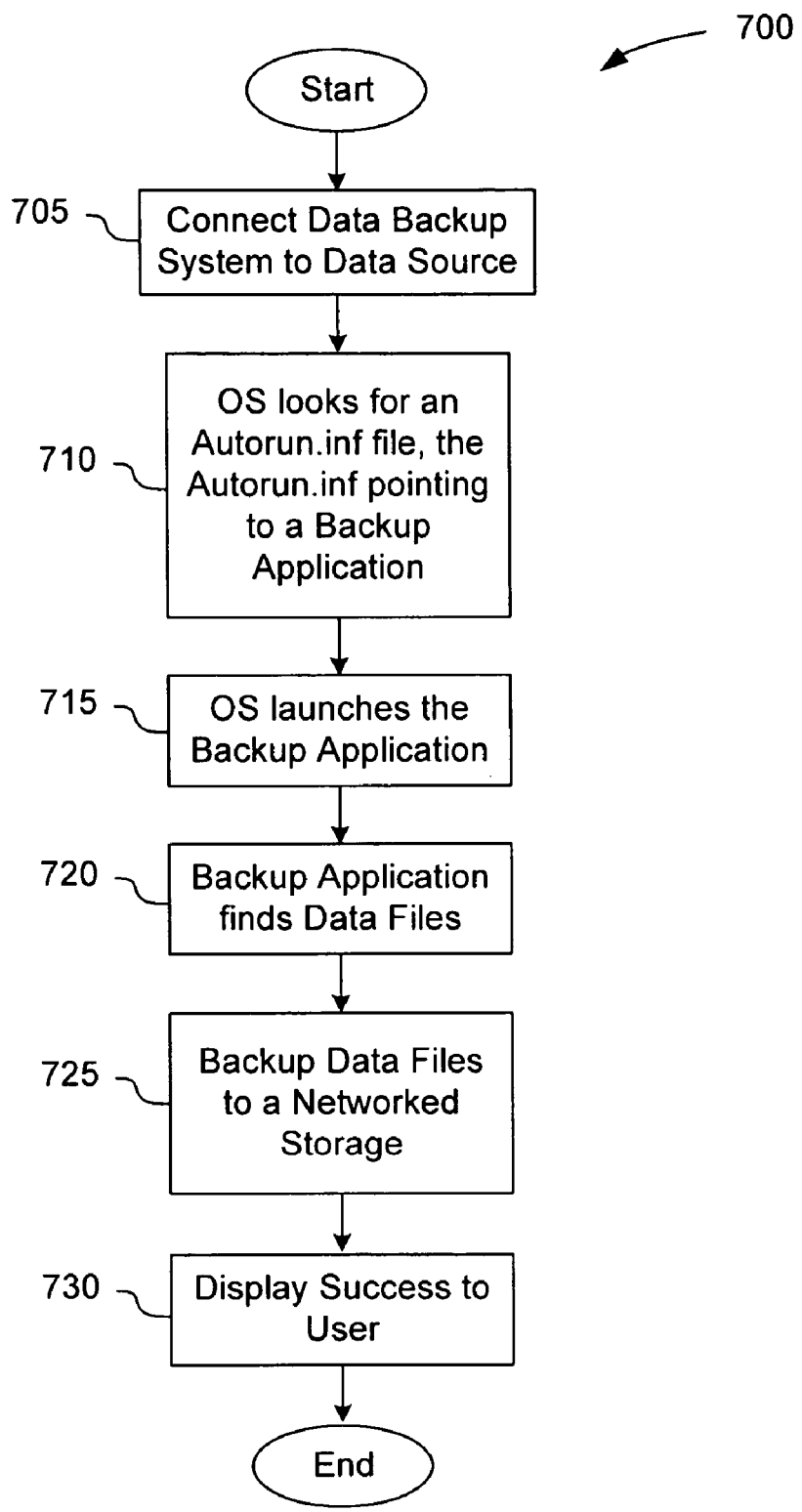
FIG. 7 is a flow-chart representation of another method for backing up data files on a data source according to another exemplary embodiment of the present invention.

FIG. 7 is a flow-chart representation of another exemplary method 700 for backing up data files from a data source. The method 700 provides for emulating an auto-launch device in order to automatically run a backup application configured to copy data files to a networked storage. The method 700 begins with connecting 705 a data source to a data backup system that includes both an emulation component and a backup application. Connecting 705 the data source to the data backup system can comprise, in some embodiments, a USB flash drive returning a response through a USB interface of the USB flash drive. Here, the response is to an inquiry from the data source, and the response identifies a flash memory of the USB flash drive as being an auto-launch device. The emulation component can represent the flash memory to be a CD drive that includes a CD medium, or a DVD drive that includes a DVD medium, for example.

In one embodiment, the Windows operating system detects the connection event of connecting 705. As provided above with respect to FIG. 4, the Windows operating system sends an inquiry for a device descriptor when new hardware is detected. Since the data backup system includes the emulation component, the Windows operating system receives from the emulation component a response comprising a device descriptor that is suitable to trigger the AutoRun functionality of the Windows operating system. Accordingly, the Windows operating system automatically looks 710 for an Autorun.inf file on the data backup system, and more specifically, within the root directory of the computer-readable instructions. In this example, the Autorun.inf file points to the backup application. Accordingly, the Windows operating system automatically launches 715 the backup application to run on the data source.

Launching 715 the backup application can comprise providing the backup application to the data source. As discussed above, another function of the emulation component is to translate between command and response formats. This can comprise receiving auto-launch device commands from the data source, translating the auto-launch device commands to flash memory commands, and sending the flash memory commands to the flash memory. Providing the data backup application can also comprise receiving flash memory responses from the flash memory, translating the flash memory responses into auto-launch device responses, and sending the auto-launch device responses to the data source.

The backup application then finds 720 data files at the data source to be backed up according to a criterion such as type of content, as described above. Next, the backup application backs up 725 the found data files to a networked storage. Once the data files have been successfully backed-up, the backup application can display 730 a message of successful completion.

Returning to backing up 725 the data files, in some embodiments the backup application is configured to automatically direct the data files to a pre-determined address, so that the user does not need to specify the networked storage. One example of a pre-determined address is a URL of a server accessible over the Internet. In such a case backing up 725 the data files includes automatically uploading the data files to the server. A pre-determined address can also be used to automatically direct data files to other networked storage such as a network drive, Network Attached Storage (NAS), and so forth.

One exemplary method that relies on the backup application having a pre-determined address for the networked storage consists of a user connecting a USB flash drive, including an emulation component, to a USB interface of a data source. In this example, an operating system of the data source automatically launches the backup application stored on the USB flash drive, and then the backup application automatically copies data files from the data source to the networked storage. Thus, the user can backup data files from the data source to the networked storage merely by connecting the USB flash drive to the data source. It will be appreciated that the operating system of the data source is able to automatically launch the backup application because of the presence of the emulation component, as provided above.

Returning again to backing up 725 the data files, in some embodiments the backup application allows a user to specify a networked storage destination. In some of these embodiments, the user specifies the backup destination by selecting the networked storage from a drop-down menu or other list. Alternately, the user can enter an address of the networked storage in a text box.

Figure 8:
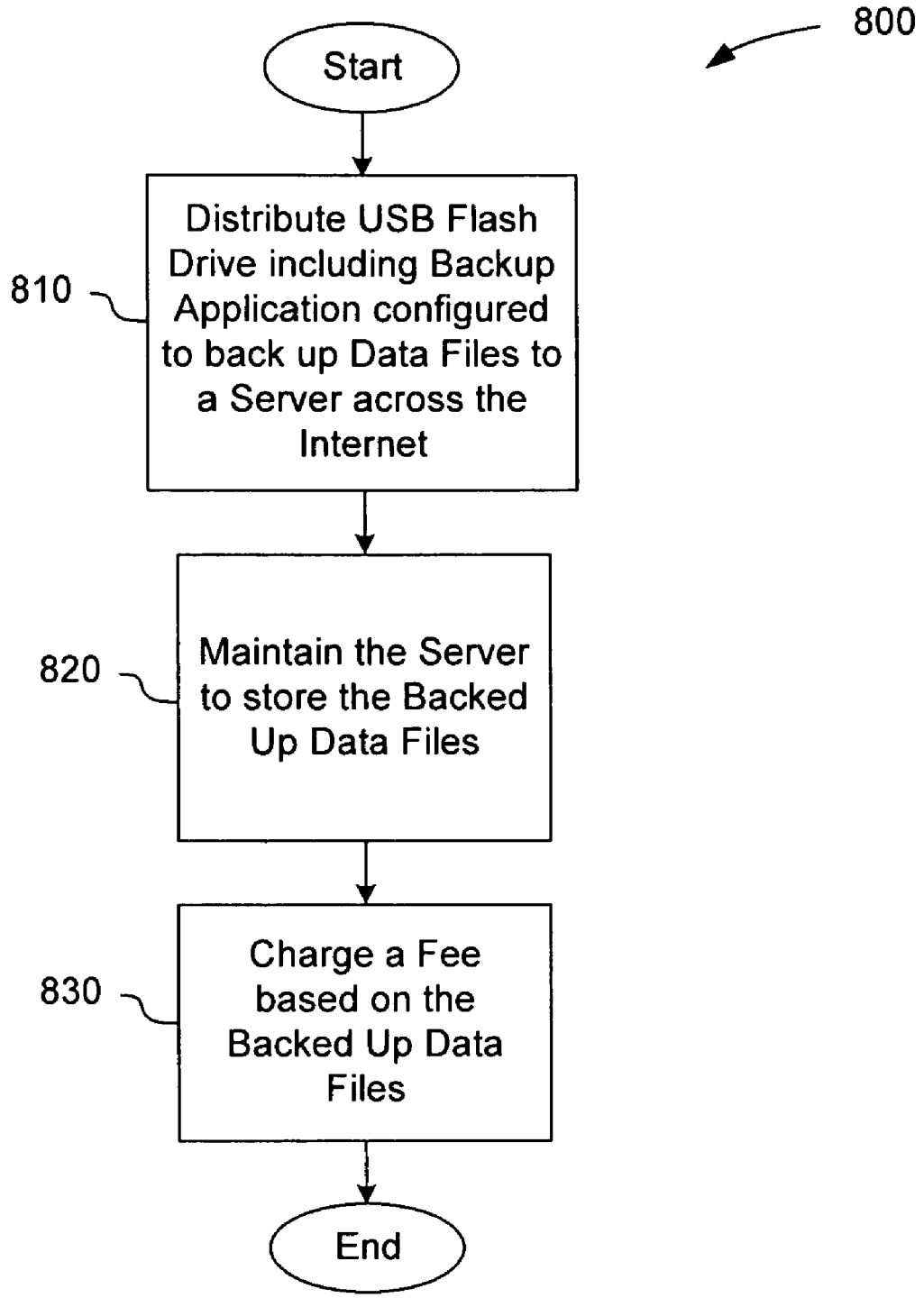
FIG. 8 is a flow-chart representation of a business method according to an exemplary embodiment of the present invention.

The present invention also provides for business methods, as illustrate by FIG. 8. The method 800 begins by distributing 810 a USB flash drive that includes computer-readable instructions. The computer readable instructions comprise the backup application which is configured to selectively back up data files from a data source to a server across the Internet. Thus, for example, an online service provider can distribute 810 the USB flash drives with an emulation component and a backup application configured to direct data files to a URL of the online service provider. It will be appreciated that distributing 810 the USB flash drives can comprise giving the USB flash drives away for free, or for no additional charge.

As shown in FIG. 8, the method 800 also comprises maintaining 820 the server to store the backed up data files, and charging a fee 830 based on the backed up data files. Maintaining 820 the server can also be performed by the online service provider, in some embodiments. Charging the fee 830 based on the backed up data files includes, in one example, charging for storing the backed up data files. In another example, charging the fee 830 includes charging for accessing the backed up data files. In still another example, charging the fee 830 includes charging for using the backed up data files. In some instances where charging the fee 830 includes charging for accessing or using the backed up data files, no fee is charged for storing the data files. Examples of uses that can be charged include printing copies of the data files, and where the data files are images, using the images in merchandising such as printing on T-shirts, coffee mugs, buttons, and so forth.

In order to charge the fee 830, in some embodiments, the backup application asks the user to provide an e-mail address after the data files have been copied to the online service provider's server. The online service provider can then send an e-mail to the user with pricing information based on the amount of storage used, for example, and requesting a credit card number for billing purposes. In other embodiments, the backup application is configured to install an access application on the data source. Launching the access application opens a browser such as Internet Explorer and directs the browser to a website of the online service provider. The online service provider can then charge a fee 830 to the user for access to, or use of, the data files.

Another example where the backup application can be configured to automatically direct the data files to be backed up to a pre-determined address is within the context of an organization, such as a corporation. For instance, an information technology (IT) department of a corporation can provide a USB flash drive comprising a backup application to an employee having a computer. The backup application can be configured to selectively back up business-related files such as e-mails and business application data. The data files are then directed to a specific drive on the corporation network that has been dedicated for this purpose. Advantageously, employees working remotely from the office can readily back up files.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A data backup system comprising:
   a USB flash drive including
   a USB interface;
   a flash memory including computer-readable instructions comprising a backup application configured to selectively copy data files from a data source to a networked storage; and
   an emulation component in communication between the flash memory and the USB interface and including logic configured to
   represent the flash memory as an auto-launch device type,
   receive auto-launch device type commands from the data source, translate the auto-launch device type, commands to flash memory device type commands, and send the flash memory device type commands to the flash memory, and
   receive flash memory device type responses from the flash memory, translate the flash memory device type responses into auto-launch device type responses, and send the auto-launch device type responses to the data source.

2. The data backup system of claim 1 wherein the networked storage comprises a server of a commercial service provider.

3. The data backup system of claim 1 wherein the backup application is further configured to allow a user to specify an address of the networked storage.

4. The data backup system of claim 1 wherein the backup application is further configured with a predetermined address of the networked storage.

5. The data backup system of claim 1 wherein the networked storage comprises a Network Attached Storage (NAS).

6. The data backup system of claim 1 wherein the networked storage comprises a drive of a Local Area Network (LAN).

7. The data backup system of claim 1 wherein the networked storage comprises a server accessible over the Internet.

8. The data backup system of claim 1 wherein the backup application is further configured to allow a user to specify the networked storage.

9. The data backup system of claim 1 wherein the backup application is further configured to allow a user to select the networked storage from a drop-down menu or other list.

10. A method for backing up data stored on a data source, the method comprising:
    providing a response to an inquiry from the data source, the response identifying a flash memory of a USB flash drive as being an auto-launch device type, the response being provided through a USB interface of the USB flash drive to the data source; and
    providing a backup application from the flash memory of the USB flash drive to the data source, the backup application configured to selectively copy data files stored on the data source to a networked storage, wherein providing the backup application includes
    receiving auto-launch device type commands from the data source, translating the auto-launch device type commands to flash memory device type commands, and sending the flash memory device type commands to the flash memory, and
    receiving flash memory device type responses from the flash memory, translating the flash memory device type responses into auto-launch device type responses, and sending the auto-launch device type responses to the data source.

11. The method of claim 10 wherein the response identifying the flash memory as being an auto-launch device type identifies the flash memory as a CD drive including a CD medium.

12. The method of claim 10 wherein the response identifying the flash memory as being an auto-launch device type identifies the flash memory as a DVD drive including a DVD medium.

13. The method of claim 10 wherein the backup application is further configured to allow a user to specify an address of the networked storage.

14. The data backup system of claim 10 wherein the backup application is further configured with a predetermined address of the networked storage.

15. The method of claim 10 wherein the networked storage comprises a server of a commercial service provider.

16. The method of claim 10 wherein the networked storage comprises a Network Attached Storage (NAS).

17. The method of claim 10 wherein the networked storage comprises a drive of a Local Area Network (LAN).

18. The method of claim 10 wherein the networked storage comprises a server accessible over the Internet.

19. The method of claim 10 wherein the backup application is further configured to allow a user to specify the networked storage.

20. The method of claim 10 wherein the backup application is further configured to allow a user to select the networked storage from a drop-down menu or other list.

* * * * *